United States Patent
Wu et al.

(10) Patent No.: US 12,204,698 B2
(45) Date of Patent: Jan. 21, 2025

(54) METHOD FOR CONTROLLING A DEVICE, ELECTRONIC DEVICE, AND STORAGE MEDIUM

(71) Applicant: BEIJING XIAOMI MOBILE SOFTWARE CO., LTD., Beijing (CN)

(72) Inventors: Shukong Wu, Beijing (CN); Haipeng Zhang, Beijing (CN); Wenqiang Fu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 18/072,430

(22) Filed: Nov. 30, 2022

(65) Prior Publication Data

US 2024/0053830 A1    Feb. 15, 2024

(30) Foreign Application Priority Data

Aug. 9, 2022    (CN) .......................... 202210952800.8

(51) Int. Cl.
    *G06F 3/02*    (2006.01)
(52) U.S. Cl.
    CPC .................. *G06F 3/0208* (2013.01)
(58) Field of Classification Search
    CPC ............... G09G 3/035; G09G 2320/08; G09G 2340/0492; G09G 2354/00; G09G 2330/022; G09G 2330/026; G09G 2360/04; G09G 2300/026; G09G 2370/22; G09G 2380/02; G06F 1/1652; G06F 9/4406; G06F 3/0231; G06F 1/1677; G06F 9/4418; G06F 3/1431; G06F 3/1446
    See application file for complete search history.

(56) References Cited

U.S. PATENT DOCUMENTS

| | | | | |
|---|---|---|---|---|
| 2015/0097788 | A1* | 4/2015 | Sip | G06F 1/3262 |
| | | | | 345/173 |
| 2015/0234478 | A1* | 8/2015 | Belesiu | G06F 1/1677 |
| | | | | 713/320 |
| 2017/0010657 | A1 | 1/2017 | Schneider | |
| 2017/0373688 | A1* | 12/2017 | Kitade | G06F 1/1618 |
| 2018/0340768 | A1* | 11/2018 | Zancanato | G06F 1/1677 |
| 2021/0348911 | A1* | 11/2021 | Rizzardini | G05B 17/02 |
| 2023/0185449 | A1* | 6/2023 | Lee | G06F 1/1677 |
| | | | | 345/168 |

FOREIGN PATENT DOCUMENTS

WO    WO2012164732    * 12/2012

OTHER PUBLICATIONS

Extended European Search Report issued on Aug. 21, 2023 in European Patent Application No. 22209771.9, 15 pages.

* cited by examiner

*Primary Examiner* — Md Saiful A Siddiqui
(74) *Attorney, Agent, or Firm* — Oblon, McClelland, Maier & Neustadt, L.L.P.

(57) ABSTRACT

A method for controlling a device, including: determining a distance state between a keyboard and a terminal device, the keyboard is in communication connection with the terminal device; in a case that the distance state is a distant state, adjusting a state of a screen of the terminal device to a wake-up state, and obtaining a first position of the keyboard and a second position of the terminal device; determining an angle between the keyboard and the screen of the terminal device according to the first position and the second position; and adjusting a state of the keyboard according to the angle.

18 Claims, 3 Drawing Sheets

--- determining a distance state between a keyboard and a terminal — S101 in a case that the distance state is a distant state, adjusting a state of a screen of the terminal to a wake-up state, and obtaining a first position of the keyboard and a second position of the terminal — S102 determining an angle between the keyboard and the screen of the terminal according to the first position and the second position — S103 adjusting a state of the keyboard according to the angle — S104

METHOD FOR CONTROLLING A DEVICE, ELECTRONIC DEVICE, AND STORAGE MEDIUM

CROSS-REFERENCE TO RELATED APPLICATIONS

This Application claims the benefit of priority to Chinese Patent Application No. 202210952800.8, filed on Aug. 9, 2022, the contents of which are incorporated herein by reference in their entireties for all purposes.

BACKGROUND

With the rapid development of Internet technology and the improvement of people's living standards, tablets have been widely used.

During the use of the tablet, when there is a small amount of input demand, a virtual keyboard displayed on the tablet screen is used to input relevant content. However, when the input volume is large, the virtual keyboard cannot meet the needs of users, and a physical keyboard can be connected to the tablet.

At present, the keyboard and the tablet can be controlled according to the angle between the keyboard and the tablet. Gravity sensors are installed on the keyboard and the tablet to collect keyboard data and tablet data in real time, so as to calculate the angle. Therefore, the calculation resource occupation rate is high and the power consumption is high.

SUMMARY

The present disclosure relates to the technical field of device control, in particular to a method for controlling a device, an electronic device, and a storage medium.

According to a first aspect of embodiments of the present disclosure, there is provided a method for controlling a device, including determining a distance state between a keyboard and a terminal device, in which the keyboard is in communication connection with the terminal device, in a case that the distance state is a distant state, adjusting a state of a screen of the terminal device to a wake-up state, and obtaining a first position of the keyboard and a second position of the terminal device, determining an angle between the keyboard and the screen of the terminal device according to the first position and the second position, and adjusting a state of the keyboard according to the angle.

According to a second aspect of embodiments of the present disclosure, there is provided an electronic device, including a terminal device and a keyboard that is in communication connection with the terminal device, the keyboard includes a first gravity sensor, the terminal device includes a processor, a memory and a second gravity sensor, the first gravity sensor is configured to collect a first position of the keyboard, the second gravity sensor is configured to collect a second position of the terminal device. The memory is configured to store executable instructions of the processor, in which the processor is configured to determine a distance state between a keyboard and a terminal device, the keyboard is in communication connection with the terminal device, in a case that the distance state is a distant state, adjust a state of a screen of the terminal device to a wake-up state, and obtain a first position of the keyboard and a second position of the terminal device, determine an angle between the keyboard and the terminal device according to the first position and the second position, and adjust a state of the keyboard according to the angle.

According to a third aspect of embodiments of the present disclosure, there is provided a non-transitory computer-readable storage medium, on which a computer instruction is stored. The instruction, when executed by a processor, causes the computer to perform a method for controlling a device, including determining a distance state between a keyboard and a terminal device, in which the keyboard is in communication connection with the terminal device, in a case that the distance state is a distant state, adjusting a state of a screen of the terminal device to a wake-up state, and obtaining a first position of the keyboard and a second position of the terminal device, determining an angle between the keyboard and the screen of the terminal device according to the first position and the second position, and adjusting a state of the keyboard according to the angle.

It should be understood that the above general description and the following detailed description are only illustrative and explanatory, and do not limit the present disclosure.

BRIEF DESCRIPTION OF THE DRAWINGS

The drawings herein are incorporated into the specification and form a part of this specification, showing embodiments consistent with the present disclosure, and are used together with the specification to explain the principles of the present disclosure.

DETAILED DESCRIPTION

Figure 1:
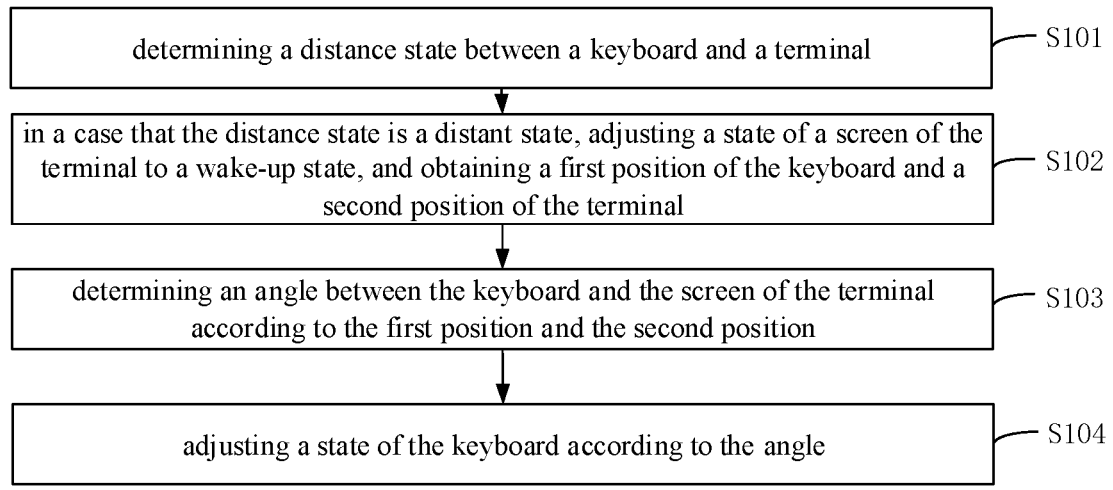
FIG. 1 is a flowchart of a method for controlling a device according to embodiments of the present disclosure.

In order to enable ordinary person in the art to better understand the technical solution of the present disclosure, the technical solution in embodiments of the present disclosure will be described clearly and completely in combination with the annexed drawings.

It should be noted that the terms "first", "second", and the like in the description and claims of the present disclosure and the drawings are used to distinguish similar objects, not necessarily to describe a specific order or sequence. It should be understood that the data so used can be interchanged where appropriate, so that embodiments of the present disclosure described herein can be implemented in an order other than those illustrated or described herein. Implementations described in the following embodiments do not represent all embodiments consistent with the present disclosure. On the contrary, they are only examples of an apparatus and a method consistent with some aspects of the present disclosure as detailed in the appended claims.

It should be noted that, user information involved in the present disclosure includes but is not limited to: user device information and user personal information. The collection, storage, use, processing, transmission, provision and disclosure of user information in the present disclosure comply with relevant laws and regulations, and do not violate public order and good customs.

With the rapid development of Internet technology and the improvement of people's living standards, tablets have been widely used.

During the use of the tablet, when there is a small amount of input demand, a virtual keyboard displayed on the tablet screen is used to input relevant content. However, when the input volume is large, the virtual keyboard cannot meet the needs of users, and a physical keyboard can be connected to the tablet.

At present, the keyboard and the tablet can be controlled according to the angle between the keyboard and the tablet. Gravity sensors are installed on the keyboard and the tablet to collect keyboard data and tablet data in real time, so as to calculate the angle. Therefore, the calculation resource occupation rate is high and the power consumption is high.

For the above technical problems, in some embodiments of the present disclosure, a distance state between a keyboard and a terminal device is determined; in a case that the distance state is a distant state, a state of a screen of the terminal device is adjusted to a wake-up state, and a first position of the keyboard and a second position of the terminal device are obtained; an angle between the keyboard and the terminal device is determined according to the first position and the second position; in a case that the distance state between the keyboard and the terminal device is the distant state, the angle between the keyboard and the terminal device is determined, and a state of the keyboard is adjusted according to the angle. Therefore there is no need of continuous calculation of the angle, which reduces the occupancy of computing resources and power consumption.

The technical solution provided by embodiments of the present disclosure is described in detail below in combination with the drawings.

FIG. 1 is a flowchart of a method for controlling a device according to embodiments of the present disclosure. As illustrated in FIG. 1, the method includes the following steps.

At block S101, a distance state between a keyboard and a terminal device is determined, in which the keyboard is in communication connection with the terminal device.

At block S102, in a case that the distance state is a distant state, a state of a screen of the terminal device is adjusted to a wake-up state, and a first position of the keyboard and a second position of the terminal device are obtained.

At block S103, an angle between the keyboard and the terminal device is determined according to the first position and the second position.

At block S104, a state of the keyboard is adjusted according to the angle.

In the embodiments, the execution subject of the above method is a terminal device that does not have a keyboard. The terminal device includes but is not limited to a tablet, a smart screen and a handheld computer.

In the embodiments, the distance state between the keyboard and the terminal device is determined; in a case that the distance state is the distant state, the state of the screen of the terminal device is adjusted to the wake-up state, and the first position of the keyboard and the second position of the terminal device are obtained; the angle between the keyboard and the terminal device is determined according to the first position and the second position; in a case that the distance state between the keyboard and the terminal device is the distant state, the angle between the keyboard and the terminal device is calculated, and the state of the keyboard is adjusted according to the angle. Therefore there is no need of continuous calculation of the angle, which reduces the occupancy of computing resources and power consumption.

It should be noted that the distance state between the keyboard and the terminal device indicates a proximity degree of the distance between the keyboard and the terminal device. In embodiments of the present disclosure, the distance state between the keyboard and the terminal device includes a distant state and a proximity state. The distant state refers to a state in which the keyboard is far away from the terminal device, and the proximity state refers to a state in which the keyboard is close to the terminal device. As for the quantization of the distance state between the keyboard and the terminal device, the distance state can be quantified by measuring a linear distance between the keyboard and the terminal device, an angle between the keyboard and the terminal device, and a magnetic induction intensity between the magnetic induction sensor of the terminal device and a magnet on the keyboard.

In the above embodiments, the distance state between the keyboard and the terminal device is determined. An implementation to realize this is to: obtain a magnetic induction intensity at any magnetic pole of a magnetic induction sensor arranged on the terminal device, in which the keyboard is provided with a magnet, the magnetic induction intensity is generated by an interaction between the magnet and the magnetic induction sensor, and the keyboard is pivotally connected to the terminal device; in a case that the magnetic induction intensity is greater than or equal to a set intensity threshold, determine that the distance state between the keyboard and the terminal device is the proximity state; and in a case that the magnetic induction intensity is less than the set intensity threshold, determine that the distance state between the keyboard and the terminal device is the distant state. It should be noted that, in the present disclosure, the set intensity threshold is not limited and can be adjusted according to the actual practice. Obviously, the magnetic induction sensor may also be installed on the keyboard, and the magnet may also be installed on the terminal device. The magnetic field interaction between the magnet and the magnetic induction sensor generates the magnetic induction intensity that changes with the distance at any magnetic pole of the magnetic induction sensor, as the distance between the keyboard and the terminal device varies. Therefore, the distance between the keyboard and the terminal device can be measured by the magnetic induction intensity generated at any magnetic pole of the magnetic induction sensor, so as to further control the keyboard and terminal device.

Figure 2:
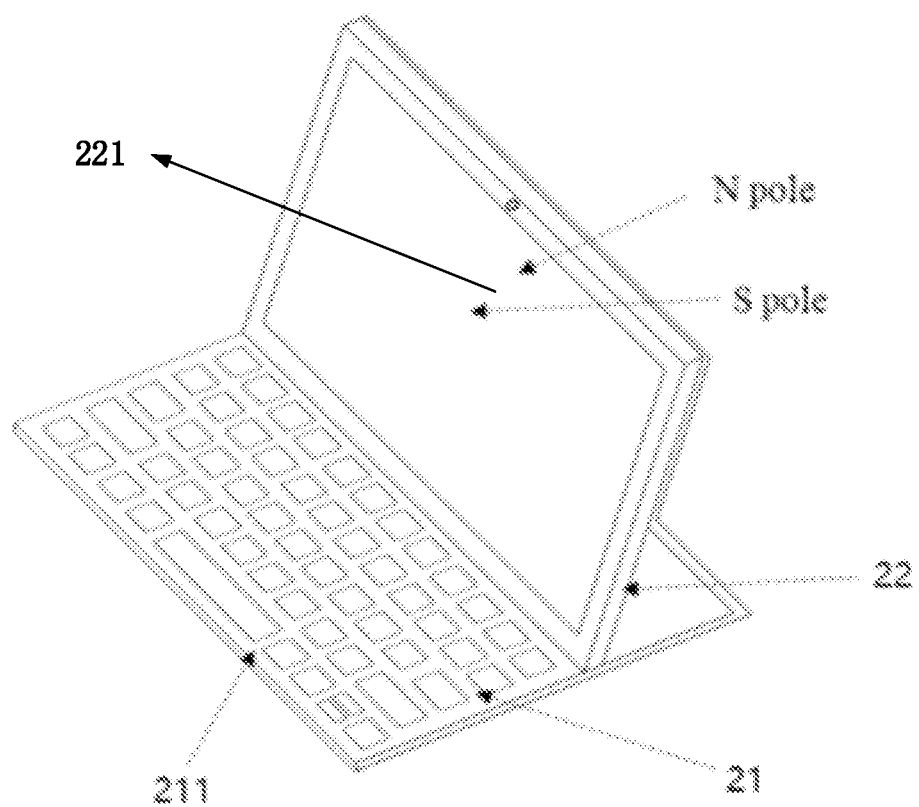
FIG. 2 is a schematic diagram of an installation structure of a keyboard and a terminal device according to embodiments of the present disclosure.

FIG. 2 is a schematic diagram of an installation structure of a keyboard and a terminal device according to embodiments of the present disclosure. As illustrated in FIG. 2, there is a keyboard 21 and a terminal device 22. A magnet 211 is arranged at a lower part of the keyboard 21, and a magnetic induction sensor 221 is arranged at an upper part of the terminal device 22. The N pole of the magnetic induction sensor 221 is located above, and the S pole of the magnetic induction sensor 221 is located below. It should be noted that FIG. 2 is only an exemplary illustration and does not constitute a limitation of the present disclosure. The type and position of magnet 211 and magnetic induction sensor 221 can be adjusted according to the actual practice.

It should be noted that a first gravity sensor is arranged on the keyboard to collect a position of the keyboard and a gravity acceleration of the keyboard. A second gravity sensor is arranged on the terminal device to collect a position of the terminal device and a gravity acceleration of the terminal device.

In some embodiments, when the distance state between the keyboard and the terminal device is the proximity state, the state of the keyboard is adjusted to a disabled state to prevent accidental touch. When the proximity state is a lid-closing state, the state of the keyboard is adjusted to the disabled state, and the state of the screen is controlled to be a sleep state. When the proximity state is a reversing-360-degree state, the state of the keyboard is adjusted to the disabled state. It should be noted that when the screen is in the sleep state, the first gravity sensor and the second gravity sensor are controlled to not work, to reduce the standby power consumption.

In some other embodiments, when the distance state between the keyboard and the terminal device is the distant state, the state of the screen of the terminal device is adjusted to wake-up state, and the first gravity sensor on the keyboard and the second gravity sensor on the terminal device starts to work. When data of the first gravity sensor on the keyboard and the second gravity sensor on the terminal device are updated, the data is reported to determine whether to perform the subsequent angle calculation.

In the above embodiments, the first position of the keyboard is obtained. An implementation to realize this is to: determine the state of the keyboard; and in a case that the state of the keyboard is a sleep state, convert the state of the keyboard from the sleep state to an available state, and collect a current position of the keyboard as the first position. The keyboard is provided with a time-out sleep, that is, the keyboard automatically enters the sleep state when there is no external trigger operation within a set time. To prevent the data of the first gravity sensor from not being updated when the keyboard is in the sleep state, when the keyboard is in the sleep state, the keyboard is activated from the sleep state to the available state, and a current position of the keyboard is uploaded in time to ensure the real-time and accuracy of the angle calculation.

In the above embodiments, the second position of the terminal device is obtained. An implementation to realize this is to: collect a current position and a current gravity acceleration of the terminal device; determine whether a difference between the current position of the terminal device and a previous position of the terminal device is greater than a distance threshold; and in a case that the difference is greater than the distance threshold, determine whether a difference between the current gravity acceleration of the terminal device and a preset gravity acceleration is greater than an acceleration threshold, and in a case that the difference between the current gravity acceleration and the preset gravity acceleration is greater than the acceleration threshold, take the current position of the terminal device as the second position. When a displacement of the terminal device is greater than the distance threshold and is not interfered by an acceleration due to an external force, the angle calculation is performed, to reduce the calculation resource consumption and improve the calculation accuracy.

It should be noted that the distance threshold and the acceleration threshold are not limited in the present disclosure, and can be adjusted according to the actual practice.

In the above embodiments, the first position is a first coordinate of the keyboard in a keyboard coordinate system, the second position is a second coordinate of the terminal device in a terminal device coordinate system, and the angle between the keyboard and the terminal device is determined according to the first position and the second position. An implementation to realize this is to: establish an equation of a relationship between coordinate and angle, according to the first coordinate and the second coordinate and a transformation relationship between the keyboard coordinate system and the terminal device coordinate system; and obtain the angle between the keyboard and the terminal device according to the equation of the relationship between coordinate and angle.

In some embodiments, the equation of the relationship between coordinate and angle is established according to the first coordinate, the second coordinate, and the transformation relationship between the keyboard coordinate system and the terminal device coordinate system.

Figure 3:
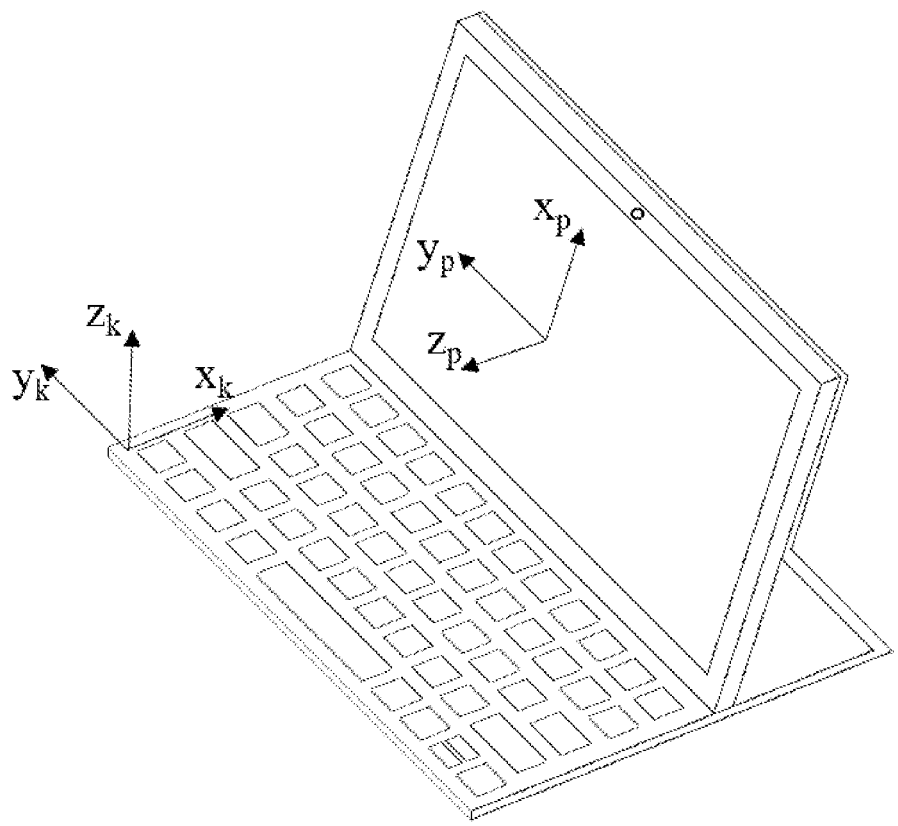
FIG. 3 is a schematic diagram of a keyboard coordinate system and a terminal device coordinate system according to embodiments of the present disclosure.

FIG. 3 is a schematic diagram of a keyboard coordinate system and a terminal device coordinate system according to embodiments of the present disclosure. As illustrated in FIG. 3, both the keyboard coordinate system and the terminal device coordinate system are right-handed systems $x_p y_p z_p$ refers to the terminal device coordinate system, and $x_k y_k z_k$ refers to the keyboard coordinate system. The angle between the terminal device and the keyboard can be converted to an angle from the terminal device coordinate system to the keyboard coordinate system around the y-axis, according to the formula of coordinate system rotation:

$$\begin{bmatrix} X' \\ Y' \\ Z' \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} X \\ Y \\ Z \end{bmatrix}$$

since the directions of the x-axis and z-axis of the rotated coordinate system need to be reversed again, the above transformation is changed to:

$$\begin{bmatrix} -X' \\ Y' \\ -Z' \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} X \\ Y \\ Z \end{bmatrix}$$

where $\theta$ is the rotation angle of the coordinate system, the coordinate of a vector in the original coordinate system is [X, Y, Z] and the coordinate of the same vector in the new coordinate system, formed by rotating the original coordinate system with the rotation angle $\theta$ around the y-axis, is [X', Y', Z']. In this scheme, the gravitational acceleration is the vector, [X, Y, Z] is the coordinate in the terminal device coordinate system, and [−X', Y', −Z'] is the coordinate in the keyboard coordinate system. The equation of the relationship between coordinate and angle is established:

$$\begin{cases} -X' = X\cos\theta - Z\sin\theta \\ -Z' = X\sin\theta + Z\cos\theta \end{cases}$$

In the above embodiments, the angle between the keyboard and the terminal device is obtained according to the equation of the relationship between coordinate and angle.

In the above embodiments, the state of the keyboard is adjusted according to the angle. An implementation to realize this is to: determine whether the angle belongs to an angle range; in a case that the angle belongs to the angle range, adjust the state of the keyboard to an available state; and in a case that the angle does not belong to the angle range, adjust the state of the keyboard to a disabled state. It should be noted that the angle range is not limited in the embodiments of the present disclosure, the angle range can be for example 15°-85°.

In some embodiments, in response to a trigger operation of the keyboard, the state of the screen is adjusted from a sleep state to the wake-up state. Through triggering the keyboard, the screen can be woken up.

In some embodiments, in a case that the state of the screen is a sleep state, the second gravity sensor does not work and stops collecting the position of the terminal device; and the second gravity sensor may also not work and stop collecting the position of the keyboard, which reduces the power consumption.

In the above embodiments of the method of the present disclosure, the distance state between the keyboard and the terminal device is determined; in a case that the distance state is the distant state, the state of the screen of the terminal device is adjusted to the wake-up state, and the first position of the keyboard and the second position of the terminal device are obtained; the angle between the keyboard and the terminal device is determined according to the first position and the second position; in a case that the distance state between the keyboard and the terminal device is the distant state, the angle between the keyboard and the terminal device is determined, and the state of the keyboard is adjusted according to the angle. Therefore there is no need of continuous calculation of the angle, which reduces the occupancy of computing resources and power consumption.

Figure 4:
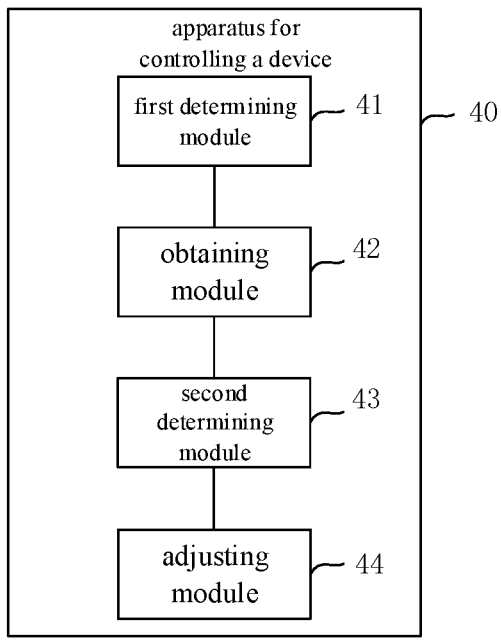
FIG. 4 is a block diagram of an apparatus for controlling a device according to embodiments of the present disclosure.

FIG. 4 is a block diagram of an apparatus for controlling a device according to embodiments of the present disclosure. As illustrated in FIG. 4, the apparatus 40 for controlling a device includes: a first determining module 41, an obtaining module 42, a second determining module 43, and an adjusting module 44.

The first determining module 41 is configured to determine a distance state between a keyboard and a terminal device, in which the keyboard is in communication connection with the terminal device.

The obtaining module 42 is configured to adjust a state of a screen of the terminal device to a wake-up state and obtain a first position of the keyboard and a second position of the terminal device in a case that the distance state is a distant state.

The second determining module 43 is configured to determine an angle between the keyboard and the screen of the terminal device according to the first position and the second position.

The adjusting module 44 is configured to adjust a state of the keyboard according to the angle.

Optionally, the obtaining module 42 is further configured to adjust the state of the keyboard to a disabled state in a case that the distance state is a proximity state.

Optionally, when determining the distance state between the keyboard and the terminal device, the first determining module 41 is configured to: obtain a magnetic induction intensity at any magnetic pole of a magnetic induction sensor arranged on the terminal device, in which the keyboard is provided with a magnet, the magnetic induction intensity is generated by an interaction between the magnet and the magnetic induction sensor, and the keyboard is pivotally connected to the terminal device; in a case that the magnetic induction intensity is greater than or equal to a set intensity threshold, determine that the distance state between the keyboard and the terminal device is the proximity state; and in a case that the magnetic induction intensity is less than the set intensity threshold, determine that the distance state between the keyboard and the terminal device is the distant state.

Optionally, when obtaining the first position of the keyboard, the obtaining module 42 is configured to: determine the state of the keyboard; and in a case that the state of the keyboard is a sleep state, convert the state of the keyboard from the sleep state to an available state and collect a current position of the keyboard as the first position.

Optionally, when obtaining the second position of the terminal device, the obtaining module 42 is configured to: collect a current position and a current gravity acceleration of the terminal device; determine whether a difference between the current position of the terminal device and a previous position of the terminal device is greater than a distance threshold; and in a case that the difference is greater than the distance threshold, determine whether a difference between the current gravity acceleration of the terminal device and a preset gravity acceleration is greater than an acceleration threshold, and in a case that the difference between the current gravity acceleration and the preset gravity acceleration is greater than the acceleration threshold, take the current position of the terminal device as the second position.

Optionally, the first position is a first coordinate of the keyboard in a keyboard coordinate system, the second position is a second coordinate of the terminal device in a terminal device coordinate system; when determining the angle between the keyboard and the screen of the terminal device according to the first position and the second position, the second determining module 43 is configured to: establish an equation of a relationship between coordinate and angle according to the first coordinate, the second coordinate, and the transformation relationship between the keyboard coordinate system and the terminal device coordinate system; and obtain the angle between the keyboard and the screen of the terminal device according to the equation of the relationship between coordinate and angle.

Optionally, when adjusting the state of the keyboard according to the angle, the adjusting module 44 is configured to: determine whether the angle belongs to an angle range; in a case that the angle belongs to the angle range, adjust the state of the keyboard to an available state; and in a case that the angle does not belong to the angle range, adjust the state of the keyboard to a disabled state.

Optionally, after adjusting the state of the keyboard to the available state, the adjusting module 44 is further configured to adjust the state of the screen from a sleep state to the wake-up state in response to a trigger operation of the keyboard.

Optionally, the adjusting module 44 is further configured to stop collecting a position of the terminal device in a case that the state of the screen is a sleep state.

As for the apparatus in the above embodiments, the specific mode for each module to perform operation has been described in detail in the embodiments of the method, and will not be described in detail here.

Figure 5:
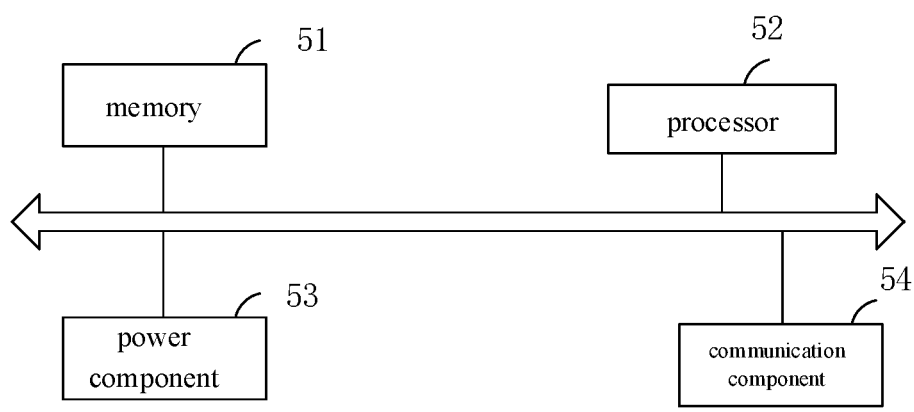
FIG. 5 is a block diagram of an electronic device according to embodiments of the present disclosure.

FIG. 5 is a block diagram of an electronic device according to embodiments of the present disclosure. As illustrated in FIG. 5, the electronic device includes a memory 51 and a processor 52. In addition, the electronic device also includes a power component 53 and a communication component 54.

The memory 51 is configured to store a computer program and configured to store various types of data to support operations at the electronic device. Examples of such data include instructions for any application or method operating on the electronic device.

The memory 51 may be implemented by any type of volatile or nonvolatile storage device or a combination of above, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The communication component 54 is used for data transmission with other devices.

The processor 52 can execute the computer instructions stored in the memory 51, to be configured to: determine a distance state between a keyboard and a terminal device; in a case that the distance state is a distant state, adjust a state of a screen of the terminal device to a wake-up state, and obtain a first position of the keyboard and a second position of the terminal device; determine an angle between the keyboard and the terminal device according to the first position and the second position; and adjust a state of the keyboard according to the angle.

Optionally, the processor 52 is further configured to adjust the state of the keyboard to a disabled state in a case that the distance state is a proximity state.

Optionally, when determining the distance state between the keyboard and the terminal device, the processor 52 is configured to: obtain a magnetic induction intensity at any magnetic pole of a magnetic induction sensor arranged on the terminal device, in which the keyboard is provided with a magnet, the magnetic induction intensity is generated by an interaction between the magnet and the magnetic induction sensor, and the keyboard is pivotally connected to the terminal device; in a case that the magnetic induction intensity is greater than or equal to a set intensity threshold, determine that the distance state between the keyboard and the terminal device is the proximity state; and in a case that the magnetic induction intensity is less than the set intensity threshold, determine that the distance state between the keyboard and the terminal device is the distant state.

Optionally, when obtaining the first position of the keyboard, the processor 52 is configured to: determine the state of the keyboard; and in a case that the state of the keyboard is a sleep state, convert the state of the keyboard from the sleep state to an available state, and collect a current position of the keyboard as the first position.

Optionally, when obtaining the second position of the terminal device, the processor 52 is configured to: collect a current position and a current gravity acceleration of the terminal device; determine whether a difference between the current position of the terminal device and a previous position of the terminal device is greater than a distance threshold; and in a case that the difference is greater than the distance threshold, determine whether a difference between the current gravity acceleration of the terminal device and a preset gravity acceleration is greater than an acceleration threshold, and in a case that the difference between the current gravity acceleration and the preset gravity acceleration is greater than the acceleration threshold, take the current position of the terminal device as the second position.

Optionally, the first position is a first coordinate of the keyboard in a keyboard coordinate system, the second position is a second coordinate of the terminal device in a terminal device coordinate system; when determining the angle between the keyboard and the screen of the terminal device according to the first position and the second position, the processor 52 is configured to: establish an equation of a relationship between coordinate and angle, according to the first coordinate, the second coordinate, and a transformation relationship between the keyboard coordinate system and the terminal device coordinate system; and obtain the angle between the keyboard and the terminal device according to the equation of the relationship between coordinate and angle.

Optionally, when adjusting the state of the keyboard according to the angle, the processor 52 is configured to: determine whether the angle belongs to an angle range; in a case that the angle belongs to the angle range, adjust the state of the keyboard to an available state; and in a case that the angle does not belong to the angle range, adjust the state of the keyboard to a disabled state.

Optionally, after adjusting the state of the keyboard to the available state, the processor 52 is configured to adjust the state of the screen from a sleep state to the wake-up state in response to a trigger operation of the keyboard.

Optionally, the processor 52 is further configured to stop collecting a position of the terminal device in a case that the state of the screen is a sleep state.

Correspondingly, embodiments of the present disclosure also provide a computer-readable storage medium storing a computer program. When a computer-readable storage medium stores a computer program and the computer program is executed by one or more processors, the one or more processors are enabled to perform the steps in the embodiment of the method illustrated in FIG. 1.

Correspondingly, embodiments of the present disclosure also provide a computer program product including a computer program or instruction, when the computer program or instruction is executed by a processor, the steps in the embodiment of the method illustrated in FIG. 1 are performed.

The communication component in the FIG. 5 is configured to facilitate wired or wireless communication between the device including the communication component and other devices. The device including the communication component may access a wireless network based on a communication standard, such as Wi-Fi, 2G, 3G, 4G/LTE, 5G, and other mobile communication networks, or their combination. In one embodiment, the communication component receives broadcast signals or broadcast related information from an external broadcast management system via a broadcast channel. In one embodiment, the communication component also includes a near field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology and other technologies.

The power component in the FIG. 5 provides power to various components of the device including the power component. The power component may include a power management system, one or more power sources, and other components associated with generating, managing, and distributing power to the device including the power component.

The electronic device may further include a display screen and an audio component.

The display screen includes a screen, the screen may include a liquid crystal display (LCD) and a touch panel (TP). When the screen includes a touch panel, the screen may be implemented as a touch screen to receive an input signal from a user. The touch panel includes one or more touch sensors to sense touch, sliding and gestures on the touch panel. The touch sensor may sense the boundary of the touch or slide action and detect the duration and pressure related to the touch or sliding operation.

The audio component is configured to output and/or input multimedia data signals. For example, the audio component includes a microphone (MIC) configured to receive external multimedia data signals when the device including the audio component is in an operating state, such as a call state, a recording state, and a voice recognition state. The received multimedia data signal may be further stored in the memory or transmitted via the communication component. In some embodiments, the audio component further includes a speaker configured to output multimedia data signals.

Those skilled in the art should understand that embodiments of the present disclosure can be provided as a method, a system, or a computer program product. Therefore, the present disclosure may take the form of a complete hardware embodiment, a complete software embodiment, or an embodiment combining software and hardware aspects. Furthermore, the present disclosure can take the form of a computer program product implemented on one or more computer usable storage media (including but not limited to disk memory, CD-ROM, optical memory, etc.) containing computer usable program codes.

In the above embodiments of the method, apparatus, storage medium and program product of the present disclosure, the distance state between the keyboard and the terminal device is determined; in a case that the distance state is the distant state, the state of the screen of the terminal device is adjusted to the wake-up state, and the first position of the keyboard and the second position of the terminal device are obtained; the angle between the keyboard and the terminal device is determined according to the first position and the second position; in a case that the distance state between the keyboard and the terminal device is the distant state, the angle between the keyboard and the terminal device is determined, and the state of the keyboard is adjusted according to the angle. Therefore there is no need of continuous calculation of the angle, which reduces the occupancy of computing resources and power consumption.

The present disclosure is described with reference to the flowchart and/or block diagram of the method, device (system), and computer program product according to the embodiment of the present disclosure. It shall be understood that each flow and/or block in the flowchart and/or block diagram, and the combination of flow and/or block in the flowchart and/or block diagram can be realized by computer program instructions. These computer program instructions may be provided to a processor of a general purpose computer, a special purpose computer, an embedded processor, or other programmable data processing device to generate a machine, such that instructions executed by a processor of a computer or other programmable data processing device generate devices for implementing functions specified in one or more flows of a flowchart and/or one or more blocks of a block diagram.

These computer program instructions can also be stored in a computer-readable memory that can guide a computer or other programmable data processing device to work in a specific way, so that the instructions stored in the computer-readable memory generate a manufacture including an instruction device that implements the functions specified in one or more flows of a flowchart and/or one or more blocks of a block diagram.

These computer program instructions can also be loaded onto a computer or other programmable data processing device to enable a series of operating steps to be executed on a computer or other programmable device to generate a computer implemented process, so that instructions executed on a computer or other programmable device provide steps for implementing functions specified in one or more flows of a flowchart and/or one or more blocks of a block diagram.

In a typical configuration, a computing device includes one or more processors (CPUs), input/output interfaces, network interfaces, and memory.

The memory may include non-permanent memory in computer-readable medium, random access memory (RAM) and/or non-volatile memory, such as read-only memory (ROM) or flash RAM. The memory is an example of computer-readable medium.

The computer-readable medium including permanent and non-permanent, removable and non-removable medium, may be stored by any method or technology. The information may be computer-readable instructions, data structures, modules of programs, or other data. Examples of the storage medium of a computer include, but are not limited to, a phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only optical disk read-only memory (CD-ROM), digital multi-function optical disk (DVD) or other optical storage, magnetic tape cartridge, magnetic tape magnetic disk storage or other magnetic storage devices or any other non-transmission media can be used to store information that can be accessed by the computing device. As defined herein, the computer-readable medium do not include any computer-readable transitory medium, such as modulated data signals and carriers.

It should be noted that in the present disclosure, the relation terms such as "first" and "second" are only used to distinguish one entity or operation from another entity or operation, and do not necessarily require or imply any such actual relationship or order between these entities or operations. Moreover, the terms "include", "comprise" or any other variant are intended to cover non-exclusive inclusion, so that a process, method, article or device including a series of elements not only includes those elements, but also includes other elements not explicitly listed, or also includes elements inherent to such process, method, article or device. Without more restrictions, the elements defined by the statement "include one . . . " do not exclude that there are other identical elements in the process, method, article or device including the elements.

The above are only specific embodiments of the present disclosure, enabling those skilled in the art to understand or realize the present disclosure. A variety of modifications to these embodiments would be apparent to those skilled in the art. The general principles defined herein can be implemented in other embodiments without departing from the spirit or scope of the present disclosure. Therefore, the present disclosure will not be limited to these embodiments herein, but should conform to the widest scope consistent with the principles and novel features disclosed herein.

What is claimed is:

1. A method for controlling a device, comprising:
   determining a distance state between a keyboard and a terminal device, wherein the keyboard is in communication connection with the terminal device;
   whenever the distance state is a distant state, adjusting a state of a screen of the terminal device to a wake-up state, and obtaining a first position of the keyboard and a second position of the terminal device;
   determining an angle between the keyboard and the screen of the terminal device according to the first position and the second position; and
   adjusting a state of the keyboard according to the angle, wherein obtaining the second position of the terminal device comprises:
   collecting a current position and a current gravity acceleration of the terminal device;

determining whether a difference between the current position of the terminal device and a previous position of the terminal device is greater than a distance threshold; and whenever the difference is greater than the distance threshold, determining whether a difference between the current gravity acceleration of the terminal device and a preset gravity acceleration is greater than an acceleration threshold, and whenever the difference between the current gravity acceleration and the preset gravity acceleration is greater than the acceleration threshold, taking the current position of the terminal device as the second position.

2. The method according to claim 1, further comprising:
whenever the distance state is a proximity state, adjusting the state of the keyboard to a disabled state.

3. The method according to claim 2, wherein determining the distance state between the keyboard and the terminal device comprises:

obtaining a magnetic induction intensity at any magnetic pole of a magnetic induction sensor arranged on the terminal device, wherein the keyboard is provided with a magnet, the magnetic induction intensity is generated by an interaction between the magnet and the magnetic induction sensor, and the keyboard is pivotally connected to the terminal device;

whenever the magnetic induction intensity is greater than or equal to a set intensity threshold, determining that the distance state between the keyboard and the terminal device is the proximity state; and whenever the magnetic induction intensity is less than the set intensity threshold, determining that the distance state between the keyboard and the terminal device is the distant state.

4. The method according to claim 1, wherein obtaining the first position of the keyboard comprises:
determining the state of the keyboard; and
whenever the state of the keyboard is a sleep state, converting the state of the keyboard from the sleep state to an available state, and collecting a current position of the keyboard as the first position.

5. The method according to claim 1, wherein adjusting the state of the keyboard according to the angle comprises:
determining whether the angle belongs to an angle range;
in a case that the angle belongs to the angle range, adjusting the state of the keyboard to an available state; and
in a case that the angle does not belong to the angle range, adjusting the state of the keyboard to a disabled state.

6. The method according to claim 5, wherein after adjusting the state of the keyboard to the available state, the method further comprises:
in response to a trigger operation of the keyboard, adjusting the state of the screen from a sleep state to the wake-up state.

7. The method according to claim 1, further comprising:
in a case that the state of the screen is a sleep state, stopping collecting a current position of the terminal device.

8. The method according to claim 1, wherein the state of the screen comprises a sleep state and the wake-up state, the state of the keyboard comprises a disabled state, a sleep state and an available state.

9. The method according to claim 1, wherein the first position is a first coordinate of the keyboard in a keyboard coordinate system, the second position is a second coordinate of the terminal device in a terminal device coordinate system, and determining the angle between the keyboard and the screen of the terminal device according to the first position and the second position comprises:
establishing an equation of a relationship between coordinate and angle, according to the first coordinate, the second coordinate, and a transformation relationship between the keyboard coordinate system and the terminal device coordinate system; and
obtaining the angle between the keyboard and the screen of the terminal device, according to the equation of the relationship between coordinate and angle.

10. An electronic device comprising a terminal device and a keyboard that is in communication connection with the terminal device,
the keyboard comprises a first gravity sensor;
the terminal device comprises a processor, a memory and a second gravity sensor;
the first gravity sensor is configured to collect a first position of the keyboard;
the second gravity sensor is configured to collect a second position of the terminal device;
the memory is configured to store executable instructions of the processor;
wherein the processor is configured to:
determine a distance state between a keyboard and a terminal device, wherein the keyboard is in communication connection with the terminal device;
whenever the distance state is a distant state, adjust a state of a screen of the terminal device to a wake-up state, and obtain a first position of the keyboard and a second position of the terminal device;
determine an angle between the keyboard and the terminal device according to the first position and the second position; and
adjust a state of the keyboard according to the angle,
wherein the processor, when obtaining the second position of the terminal device, is configured to:
collect a current position and a current gravity acceleration of the terminal device;
determine whether a difference between the current position of the terminal device and a previous position of the terminal device is greater than a distance threshold; and
whenever the difference is greater than the distance threshold, determine whether a difference between the current gravity acceleration of the terminal device and a preset gravity acceleration is greater than an acceleration threshold, and whenever the difference between the current gravity acceleration and the preset gravity acceleration is greater than the acceleration threshold, take the current position of the terminal device as the second position.

11. The device according to claim 10, wherein the processor is further configured to adjust the state of the keyboard to a disabled state in a case that the distance state is a proximity state.

12. The device according to claim 11, wherein the processor, when determining the distance state between the keyboard and the terminal device, is configured to:
obtain a magnetic induction intensity at any magnetic pole of a magnetic induction sensor arranged on the terminal device, wherein the keyboard is provided with a magnet, the magnetic induction intensity is generated by an interaction between the magnet and the magnetic induction sensor, and the keyboard is pivotally connected to the terminal device;

whenever the magnetic induction intensity is greater than or equal to a set intensity threshold, determine that the distance state between the keyboard and the terminal device is the proximity state; and whenever the magnetic induction intensity is less than the set intensity threshold, determine that the distance state between the keyboard and the terminal device is the distant state.

13. The device according to claim 10, the processor, when obtaining the first position of the keyboard, is configured to:
determine the state of the keyboard; and
whenever the state of the keyboard is a sleep state, convert the state of the keyboard from the sleep state to an available state, and collect a current position of the keyboard as the first position.

14. The device according to claim 10, wherein the processor, when adjusting the state of the keyboard according to the angle, is configured to:
determine whether the angle belongs to an angle range;
whenever the angle belongs to the angle range, adjust the state of the keyboard to an available state; and
whenever the angle does not belong to the angle range, adjust the state of the keyboard to a disabled state.

15. The device according to claim 14, wherein the processor, after adjusting the state of the keyboard to the available state, is configured to adjust the state of the screen from a sleep state to the wake-up state in response to a trigger operation of the keyboard.

16. The device according to claim 10, wherein the processor is further configured to stop collecting a current position of the terminal device in a case that the state of the screen is a sleep state.

17. The device according to claim 10, wherein the first position is a first coordinate of the keyboard in a keyboard coordinate system, the second position is a second coordinate of the terminal device in a terminal device coordinate system, and the processor, when determining the angle between the keyboard and the screen of the terminal device according to the first position and the second position, is configured to:
establish an equation of a relationship between coordinate and angle according to the first coordinate, the second coordinate, and a transformation relationship between the keyboard coordinate system and the terminal device coordinate system; and
obtain the angle between the keyboard and the terminal device according to the equation of the relationship between coordinate and angle.

18. A non-transitory computer-readable storage medium, on which a computer instruction is stored, wherein the instruction, when executed by a processor, causes the computer to implement a method for controlling a device, comprising:
determining a distance state between a keyboard and a terminal device, wherein the keyboard is in communication connection with the terminal device;
whenever the distance state is a distant state, adjusting a state of a screen of the terminal device to a wake-up state, and obtaining a first position of the keyboard and a second position of the terminal device;
determining an angle between the keyboard and the screen of the terminal device according to the first position and the second position; and
adjusting a state of the keyboard according to the angle, wherein obtaining the second position of the terminal device comprises:
collecting a current position and a current gravity acceleration of the terminal device;
determining whether a difference between the current position of the terminal device and a previous position of the terminal device is greater than a distance threshold; and
whenever the difference is greater than the distance threshold, determining whether a difference between the current gravity acceleration of the terminal device and a preset gravity acceleration is greater than an acceleration threshold, and whenever the difference between the current gravity acceleration and the preset gravity acceleration is greater than the acceleration threshold, taking the current position of the terminal device as the second position.

* * * * *